United States Patent [19]
Suarez

[11] Patent Number: 5,755,541
[45] Date of Patent: May 26, 1998

[54] DRUM TRANSPORT SUPPORT SYSTEM

[75] Inventor: Pedro Roberto Suarez, Coral Cables, Fla.

[73] Assignee: Inter-American Vanguard Corporation, Miami, Fla.

[21] Appl. No.: 642,600

[22] Filed: May 3, 1996

[51] Int. Cl.$^6$ .................................................. B60P 7/12
[52] U.S. Cl. ........................ 410/36; 410/42; 410/49; 410/50; 211/59.4
[58] Field of Search .................... 410/36, 42, 31, 410/32, 34, 39, 40, 47, 49, 50, 97; 211/59.4, 85.5, 13.1; 105/362, 355; 206/391, 394, 446, 435; 248/146

[56] References Cited

U.S. PATENT DOCUMENTS

| | | | |
|---|---|---|---|
| Re. 30,373 | 8/1980 | Nist, Jr. | 410/42 X |
| 1,523,252 | 1/1925 | Bradley et al. | 410/50 X |
| 2,248,119 | 7/1941 | Reed et al. | 410/36 X |
| 2,335,518 | 11/1943 | Koonce | 410/42 |
| 2,370,551 | 2/1945 | Liebgott et al. | 410/36 |
| 2,555,529 | 6/1951 | Batts . | |
| 2,593,472 | 4/1952 | McGinn | 211/59.4 X |
| 2,599,612 | 6/1952 | Cope . | |
| 2,611,495 | 9/1952 | Weaver . | |
| 2,766,660 | 10/1956 | Laddon et al. . | |
| 2,862,631 | 12/1958 | Gamble . | |
| 2,904,340 | 9/1959 | Simpson . | |
| 2,958,492 | 11/1960 | Maynard | 410/49 |
| 3,022,031 | 2/1962 | Bauer et al. | 410/49 X |
| 3,091,348 | 5/1963 | Neuhauser . | |
| 3,194,525 | 7/1965 | Webb . | |
| 3,229,825 | 1/1966 | Brown, Jr. . | |
| 3,372,812 | 3/1968 | Parcels . | |
| 4,175,666 | 11/1979 | Smith . | |
| 4,195,732 | 4/1980 | Bell . | |
| 4,391,377 | 7/1983 | Ziaylek, Jr. | 410/49 X |
| 4,412,615 | 11/1983 | Forshee | 410/31 X |
| 4,444,311 | 4/1984 | Rias | 206/391 |
| 4,506,796 | 3/1985 | Thompson . | |
| 4,732,528 | 3/1988 | Good . | |
| 4,901,870 | 2/1990 | Wright et al. . | |
| 5,065,688 | 11/1991 | Moody . | |
| 5,080,314 | 1/1992 | Moyer et al. . | |
| 5,123,547 | 6/1992 | Koch . | |
| 5,161,703 | 11/1992 | Patton . | |
| 5,267,648 | 12/1993 | Baker . | |
| 5,516,244 | 5/1996 | Baka | 410/36 |

FOREIGN PATENT DOCUMENTS

| | | | |
|---|---|---|---|
| 504404 | 7/1959 | Canada | 410/36 |
| 1 160 455 | 1/1964 | Germany | 410/42 |
| 1 323 953 | 7/1973 | Germany | 410/42 |
| 2 208 139 | 8/1973 | Germany . | |
| 759 360 | 9/1980 | U.S.S.R. | 410/36 |
| 1 331 693 | 8/1987 | U.S.S.R. | 410/36 |

*Primary Examiner*—Stephen Gordon
*Attorney, Agent, or Firm*—Jacobson, Price, Holman & Stern, PLLC

[57] ABSTRACT

A drum transport support system is used to ship large cylindrical objects, such as cement mixing drums, on a rail car. Each drum is cylindrical and tapered so that the rear end of the drum has a large diameter and the front end has a small diameter. The front end or neck of each drum is fitted with a tire or collar. The support system has multiple support units that each support two drums. Each support unit has a front frame that is aligned with a back frame. Each frame has an upper and lower cross members, each having a cradle for receiving a respective front end or rear end of a drum. The cradle that receives the front end of the drum is fitted with clips that define a mouth. The mouth operates to receive the drum tire. Each frame has a lower cross member that is welded to two vertical posts. The vertical posts of the front frame are then fastened to the vertical posts of the back frame. A first or bottom drum is placed in the cradle of the lower cross members. An upper cross member, for both the front and back frames, is placed over the bottom drum and bolted to the respective vertical posts. The second or top drum is then placed in the cradle of the upper cross members. A band or strap secures the top drum to the rail car. The cradles prevent the drums from moving laterally, while the clips and tires cooperate to prevent the drums from moving longitudinally.

18 Claims, 9 Drawing Sheets

DRUM TRANSPORT SUPPORT SYSTEM

BACKGROUND OF THE INVENTION

1. Field of the Invention

The present invention relates to a drum transport support system. More particularly, the present invention relates to a support for transporting concrete mixing drums on a rail car or a tractor trailer.

2. Description of the Related Art

Cylindrical objects, such as pipes, drums, missiles, oxygen/gas tanks, and the like, of normally constant cross-sectional diameter are normally shipped on a flatbed truck and stored on rectangular skids. Of these cylindrical objections, some may be vertically oriented and fastened together and/or anchored to a fixed object. However, for elongated objects of varying cross-sectional shape that must be shipped or stored horizontally, there is a need for a system of stacking and transporting these objects by rail or truck.

The prior art systems are not suitable for use with elongated objects that taper toward one end, such as a concrete mixing drum. In addition, the prior art transport supports do not provide sufficient support for large, lengthy objects. These prior art systems also do not provide support to prevent elongated objects from moving forward and backward.

SUMMARY OF THE INVENTION

Accordingly, it is an object of the present invention to provide a transport support for horizontally-positioned elongated objects of varying cross-sectional circular configuration, such as concrete mixing drums. It is a further object of the invention to provide a transport support that provides support to prevent these elongated objects from sliding forward and backward.

The drum transport support system of the present invention is used to ship large elongated objects, such as cement mixing drums, on a rail car or by truck. Each drum is elongated and tapered so that the portion of the drum having the largest diameter is adjacent to the rear end of the drum and has a diameter substantially larger than the front end of the drum. The front end or neck of each drum is fitted with an annular tire or collar surrounding the drum. The tire or collar is made of a rigid material such as steel.

The support system has multiple support units that each support two drums. Each support unit essentially has a front frame that is aligned with, and connected to, a rear frame. Each frame includes an upper and lower cross member having an arcuate cradle on the upper surface of the lower cross member of the front and rear frames for receiving one end of a drum. A further arcuate cradle is located on the lower surface of the upper cross members of the front and rear frames and is designed to rest on the top of the drum. Each arcuate cradle of the lower cross member and the upper cross member of the frame that receives the front end of the drum are fitted with clips that define a mouth for receiving a drum tire or collar surrounding the front end of the drum. The cross member receiving the larger, rear end of the drum does not require clips included in its arcuate cradle.

A lower cross member of the front and rear frames of the support system are welded to two vertical posts located on opposite ends of each lower cross member. Two tension rods or cables on each end of the lower cross members are arranged in an X-configuration to fasten the vertical posts of the front frame to the vertical posts of the rear frame. After the tension rods or cables and lower cross members are assembled, a first or bottom drum is placed in the cradle of the lower cross member of the front and rear frames. Once the bottom drum is in place, an upper cross member, for both the front and back frames, is placed over the bottom drum and bolted to the respective vertical posts extending upwardly from the opposite ends of the lower cross members. The arcuate cradle on the lower surface of the upper cross members rests on top of the bottom drum. The arcuate cradle on the lower surface of the upper cross member engaging the front end of the drum includes clips for engaging the tire or collar.

After the upper cross members are in position, a second or top drum is then placed in the arcuate cradle of the upper cross members in an orientation reversed to that of the successively lower drum. Again, the arcuate cradle holding the front end of the second drum includes clips that engage the tire or collar on the front end of the second drum.

A band or strap is placed over the top of the second drum and secured to the rail car. The cradles prevent the drums from moving laterally, while the clips and tires cooperate to prevent the drums from moving longitudinally.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 1:
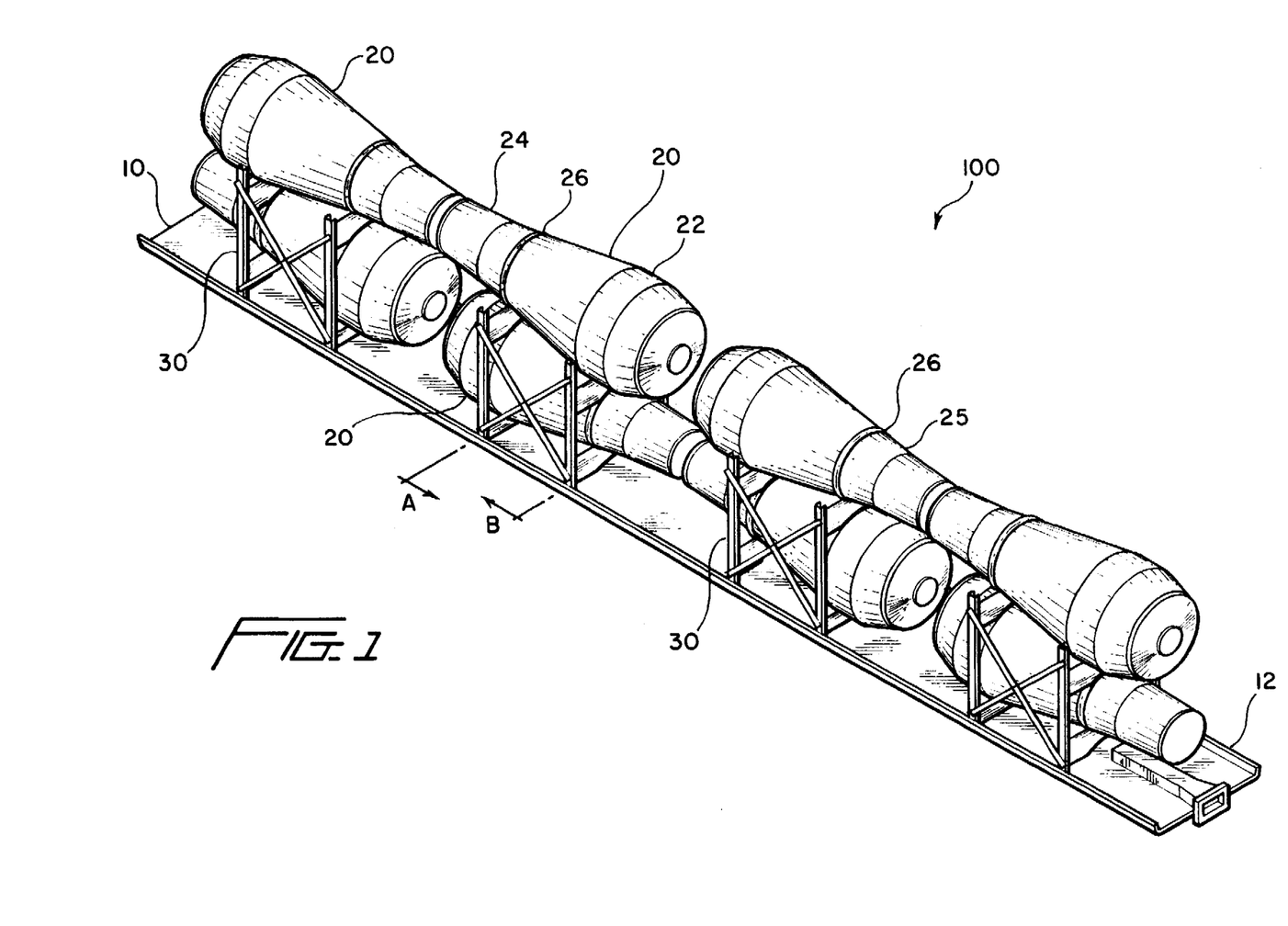
FIG. 1 is a perspective view of the drum transport system having multiple support units in accordance with the preferred embodiment of the present invention.
Figure 8:
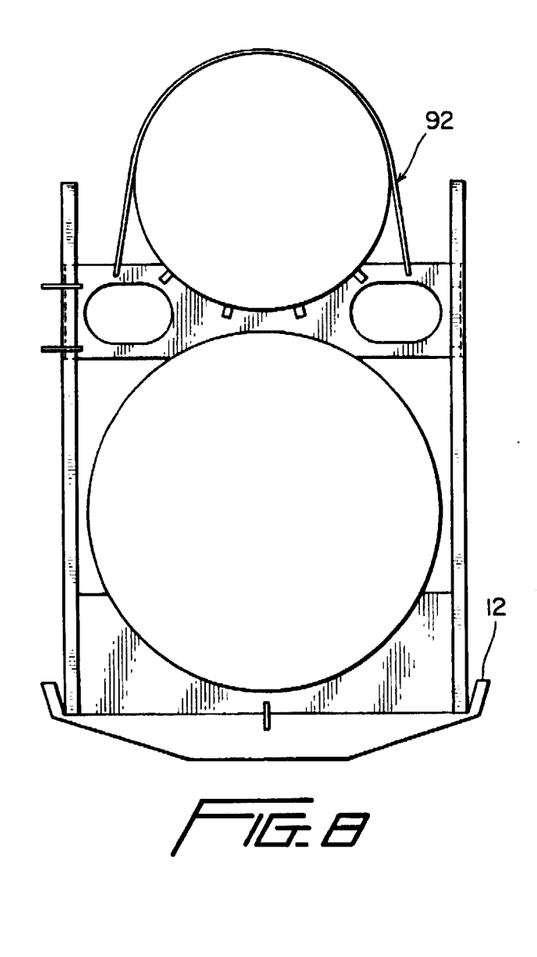
FIGS. 8 and 9 are cross-sectional views taken along lines A—A and B—B of FIG. 1, and showing alternative embodiments of the invention.
Figure 9:
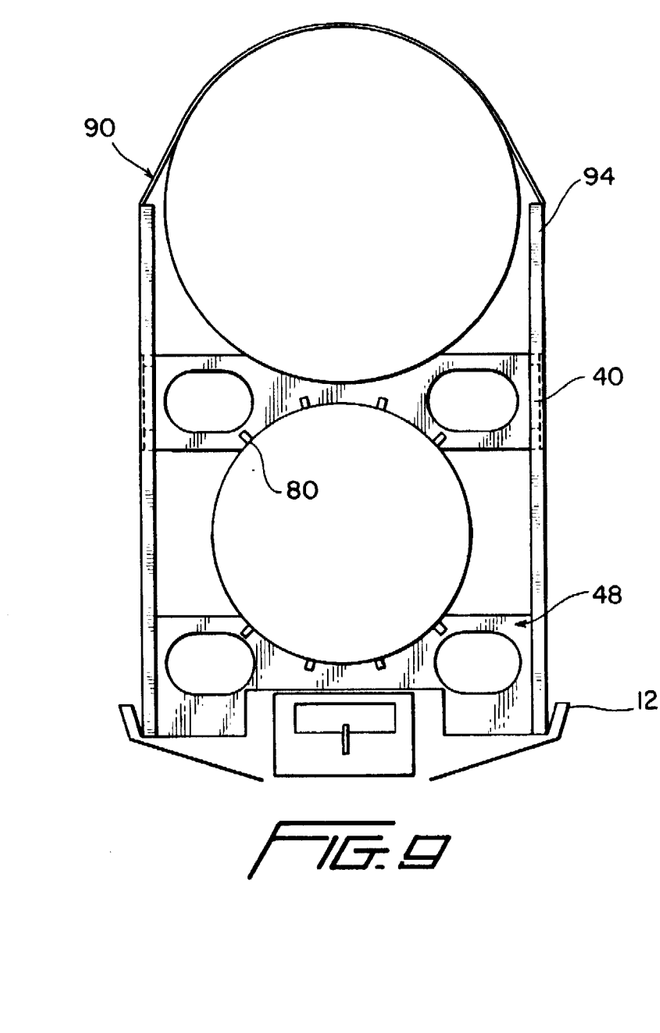

Referring now to the drawings, FIG. 1 shows the general embodiment of the drum transport support system 100 in accordance with the present invention. Rail car or truck bed 10 is shown transporting multiple concrete mixing drums 20 on transport support units 30. Rail car 10 preferably has raised edges 12 that extend upwardly and outwardly at an angle along the entire length of rail car 10 as shown in FIGS. 8 and 9. Preferably, edges 12 form about a 70 to 75 degree angle with the floor of rail car 10.

Returning to FIG. 1, each drum 20 has an overall tapered, elongated shape such that drum 20 generally has a large rear end 22 and a smaller front end 24. In addition, each drum 20 has a neck 25 which is fitted with a steel collar or tire 26, the function of which will become more apparent with reference to the overall description of the invention.

Each support unit 30 supports two drums 20, which are inversely stacked. Preferably, the front end 24 of the top drum 20 overlays the rear end 22 of the lower or bottom drum 20. In addition, the rear end 22 of the bottom drum 20 is adjacent to the rear end 22 of the neighboring bottom drum 20. Adjacent support units 30 support drums in inverse relationship as shown in FIG. 1.

In the preferred embodiment, the maximum height of the system 100, fully assembled on rail car 10, is about 17 feet, 3¾ inches. The highest point will be at the location of the rear end 22 of the top drum 20.

The rail car 10 is roughly 9 feet wide, so that support unit 30 is designed to be approximately 8 feet wide, as will be described below. Drum transport support system 100 may further be used in conjunction with a tractor trailer, ship, and like transport systems, or as a self-standing support system for storage of cylindrical objects.

Figure 2:
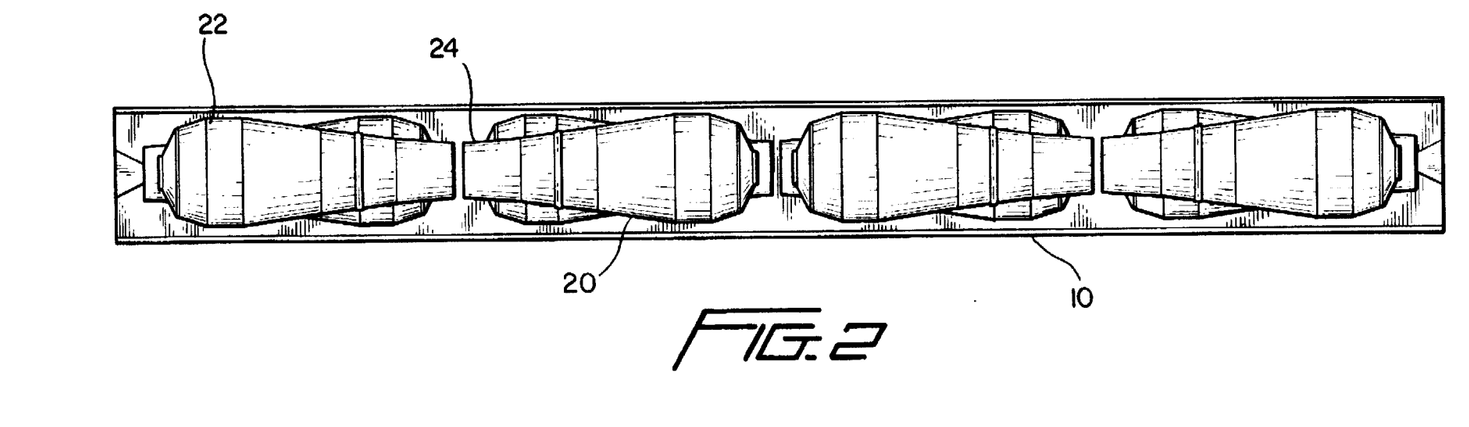
FIG. 2 is a top view of the drum transport system of FIG. 1.

As shown in FIG. 2, the front end 24 of each top drum 20 extends beyond the rear end 22 of the bottom drum 20. By overlaying drums 20, the weight of the drums 20, which is mostly concentrated about the rear end 22 of drum 20, is centrally concentrated to provide a more stable system. In addition, the drums 20 are offset to better conform the shape of top drum 20 with the inverse shape of the bottom drum 20. Also, the inverse relationship of the drums 20 significantly reduces the height of the system.

Preferably, drums 20 are about 19 feet, 8 inches to 20 feet in length, although drums 20 of all sizes are suitable, including drums of about 15 feet in length. The tire or collar 26 has a diameter of approximately 72 inches at the position on front end 24. The rear end 22 of drum 20 has a diameter of about 90 to 92 inches. The tire 26 has a width of about 4 inches and a thickness from about 1 to 1½ inches.

Front end 24 of the top drum 20 overhangs anywhere from about 18 to 30 inches from the rear end 22 of the bottom drum 20. The support units 30 are capable of supporting two drums 20, each drum weighing roughly 4,500 pounds. In the preferred embodiment, the rail car 10 is 60 to 80 feet in length, so that eight drums 20 may be carried per car. However, the number of drums 20 per car 10 will vary depending upon the respective lengths of car 10 and drums 20.

Now turning to FIG. 3, a single support unit 30 will now be described in greater detail. Support unit 30 generally comprises a front frame 34 and a rear frame 36. The front and rear frames 34, 36 are connected by four tension rods or cables 38 extending between the frames in an X-configuration. Each front frame 34 and each rear frame 36 has two vertical posts 40 connected by a horizontal upper cross member 42, 44, respectively, and a horizontal lower cross member 46, 48, respectively. Though frames 34, 36 are discussed here as being a front and rear frame, respectively, it will become apparent that the designs of the frames are interchangeable.

In the preferred embodiment, posts 40 of support units 30 are spaced approximately 7 feet, 10 inches apart. However, the vertical posts 40 may be anywhere from 6 feet apart, to 8 feet apart, and may even vary further depending upon the size of the drums 20 being transported.

Figure 3:
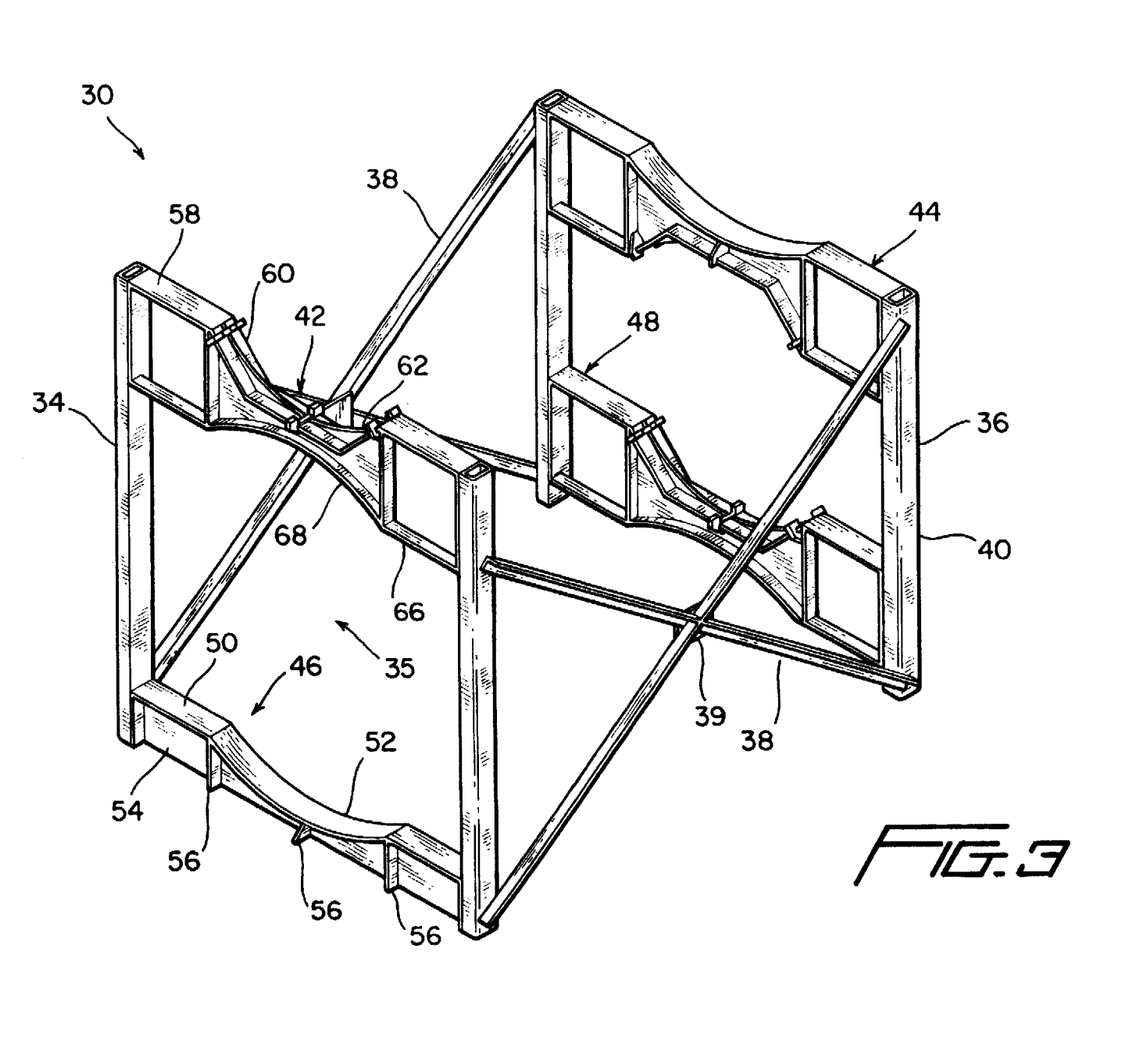
FIG. 3 is a perspective view of a support unit having a front frame and a rear frame in accordance with the preferred embodiment of the invention.

The support unit 30 shown in FIG. 3 is designed so that the rear end 22 of a bottom drum 20 is positioned in the lower cross member 46 of front frame 34. Accordingly, the front end 24 of the bottom drum 20 is positioned in the lower cross member 48 of rear frame 36. Likewise, the rear end 22 of a top drum 20 is to be located on the upper cross member 44 of rear frame 36 and the front end 24 of the top drum 20 is to be placed on the upper cross member 42 of front frame 34. The front and rear frames 34, 36 are configured differently in order to receive the respective front and rear ends 24, 22 of drum 20, as will be discussed below.

Figure 4:
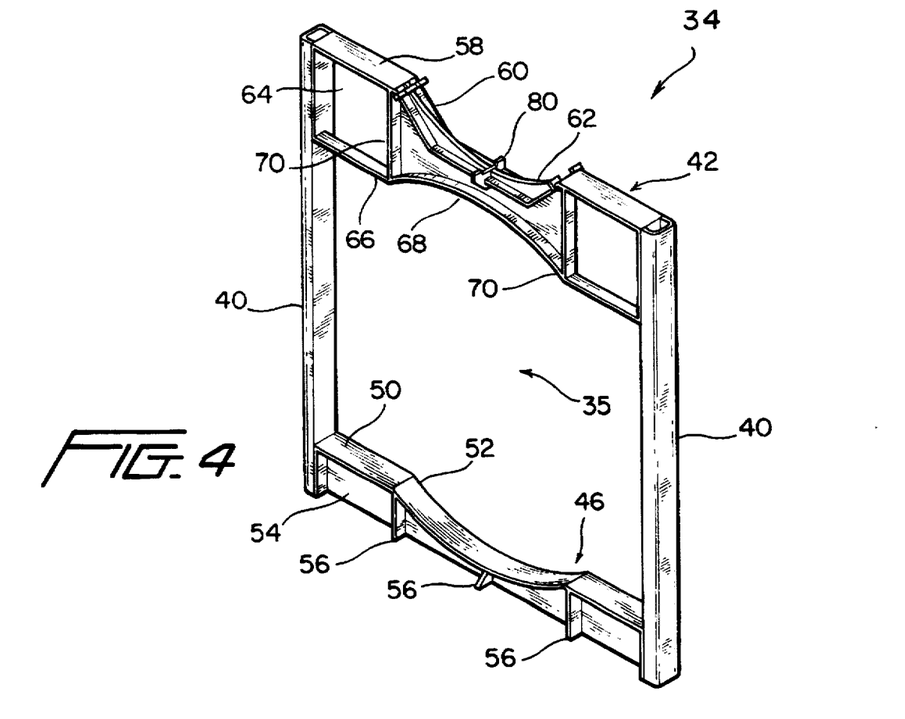
FIG. 4 is a perspective view of the front frame shown in FIG. 3.

First referring to front frame 34, a large lower cavity 35 is provided for receiving the rear end 22 of drum 20. As best shown in FIG. 4, lower cross member 46 has a wide top surface 50. Top surface 50 has a smooth rounded cradle plate 52 located centrally between vertical posts 40. The diameter of cradle plate 52 is substantially the same as the diameter of the rear end 22 of drum 20. Top surface 50 provides direct support to the large rear end 22 of drum 20. Lower cross member 46 further has a thin vertical support plate 54 for supporting the weight of the drum 20 incident to top surface 50. The top surface 50 of the lower cross member 46 overhangs vertical support plate 54.

Three vertical reinforcing members 56 are spaced along vertical support plate 54 to provide additional support to top surface 50. Two reinforcing members 56 are preferably located at each edge of the rounded cradle plate 52 and are rectangular in shape. The third reinforcing member 56 is preferably located about the center of rounded cradle plate 52 and is generally in the shape of a 45 degree right triangle. The bottom of each vertical reinforcing member 56, as well as the vertical support plate 54, rests flush with the floor of rail car 10.

Still referring to front frame 34 in FIG. 4, the upper cross member 42 has a wide top surface 58 and a centrally located angled surface or cradle 60. The angled cradle 60 has a horizontal middle with sloped sides. A vertical rounded plate 62 is welded to the angled cradle 60. The diameter of the vertical rounded plate 62 substantially conforms to the diameter of the tire 26 on the front end 24 of drum 20.

Figure 13:
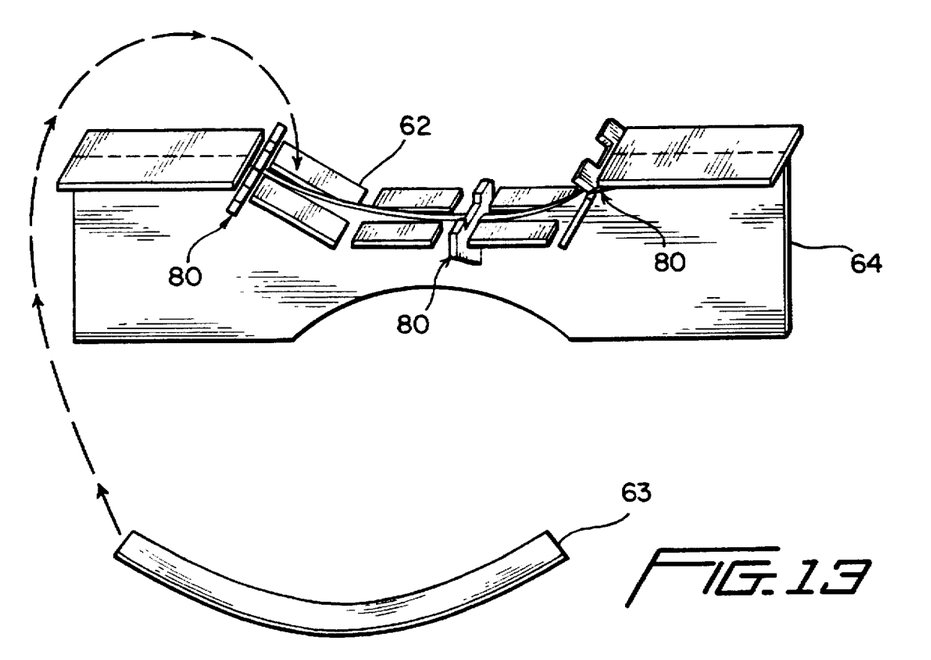
FIG. 13 is an exploded view of the top rounded surface plate connecting with the top surface of a cross member shown in FIG. 5.

A horizontal top plate 63 may optionally be placed over the vertical rounded plate 62 as shown in FIG. 13. In the preferred embodiment, vertical rounded plate 62 has a thickness of about ¼ inch, and the horizontal top plate has a thickness anywhere from ⅛ to one-sixteenth of an inch. The top plate may further be covered with a carpet (not shown) to further cushion drum 20 and prevent damage to drum 20. The raised plate 62 is fitted with clips 80 which function to receive tire 26 of drum 20, which is shown in FIG. 1. The clip 80 will be discussed in further detail below.

Support is provided to top surface 58 and angled cradle 60 by a thin vertical support plate 64. The top surfaces 58 and angled cradle 60, respectively, overhang vertical support plate 64. Upper cross member 42 further has a smooth lower surface 66 having a centrally located rounded cradle plate 68 which rests on the top of bottom drum 20. The lower surface 66 overhangs vertical support plate 64. Rounded cradle plates 52 and 68 cooperate to define an opening 35 for the rear end 22 of drum 20 that prevents lateral movement and damage to drum 20.

Reinforcing members 70 extend from the overhanging lower surface 66 to the overhanging top surface 58 in order to provide additional support to the top surface 58 and angled cradle 60. The bottom drum 20 provides vertical support to lower surface 66 and reinforcing members 70 which translates to the top surface 58 and angled cradle 60.

Turning back to FIG. 3, rear frame 36 will now be discussed in conjunction with FIG. 5. Lower cross member 48 is similar to the upper cross member 42 of front frame 34. Rounded cradle plate 68 is located centrally about lower surface 66 so that lower cross member 48 of rear frame 36 is interchangeable with upper cross member 42 of front frame 34. In addition, angled cradle 60 is elevated with respect to the lower cross member 46 of front frame 34 to correspond with the tapered dimensions of drum 20. Likewise, rear frame 36 defines a lower cavity 37 that is substantially smaller than the lower cavity 35 of front frame 34.

Upper cross member 44 of rear frame 36 is similar to the lower cross member 48 of rear frame 36 and upper cross member 42 of front frame 34, only inverted. That is, the rounded surface is on top, and the angled surface is on the bottom in upper cross member 44. Rear frame 36 is designed to accommodate the front end 24 of bottom drum 20. In accordance with the preferred embodiment, vertical support plates 54, 64 of the upper and lower cross members 42, 44, 46, 48 are each approximately ¼ inch thick.

A majority of the weight from drum 20 will be located at the rear end 22 of the drum 20, which is supported by lower cross member 46 of front frame 34. Lower cross member 48 of rear frame 36 only has to support the weight from the front end 24 of drum 20. Therefore, lower cross member 48 need not be as strong as lower cross member 46. In the preferred embodiment, therefore, lower cross member 46 is used to prevent sideways or lateral movement of bottom drum 20. On the other hand, cradles 60, of the lower and upper cross members 48, 44, respectively, are used to prevent forward and backward or longitudinal sliding of drum 20 that may occur during starting and stopping of the rail car 10.

Figure 5:
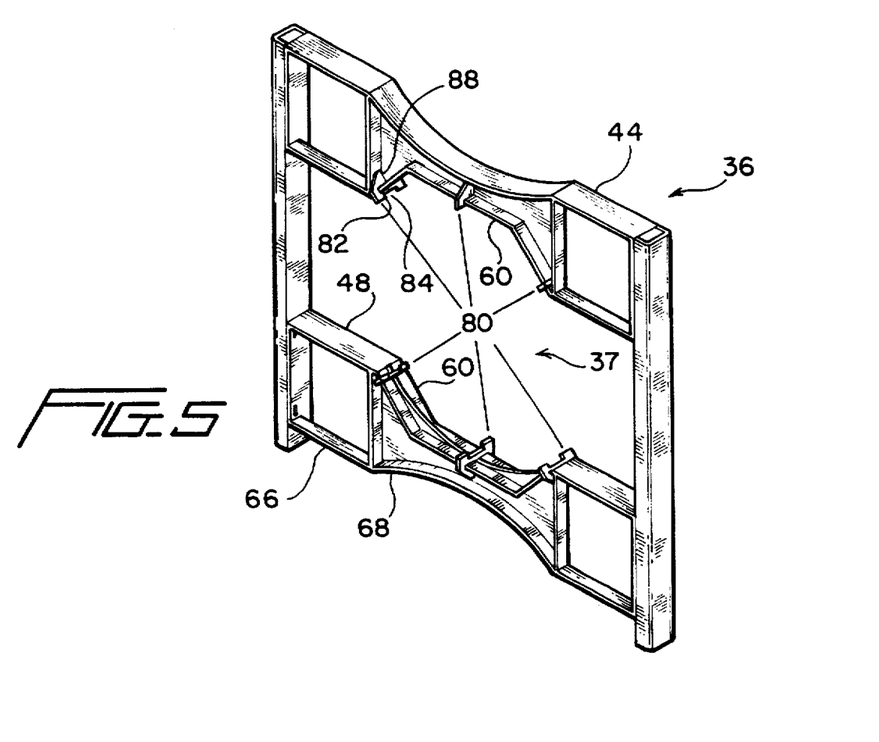
FIG. 5 is a perspective view of the rear frame shown in FIG. 3.
Figure 12A:
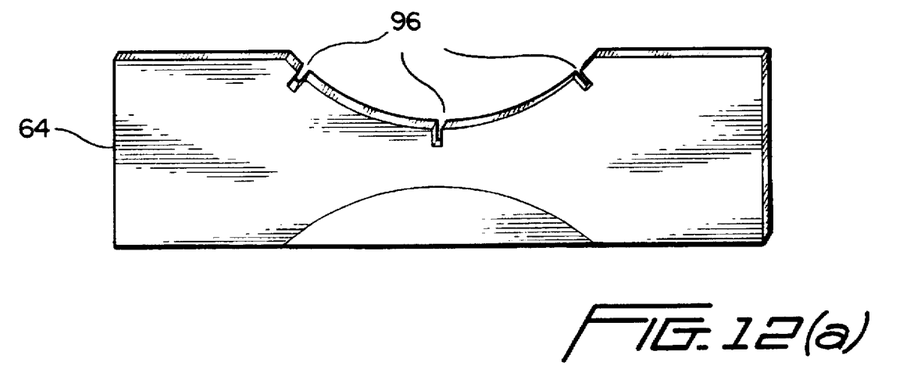
FIGS. 12a and 12b are views of the vertical supporting plate and the clip, respectively.
Figure 12B:
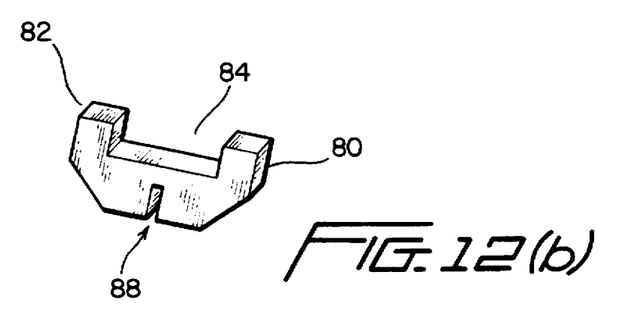

Referring to FIG. 5, multiple clips 80 are shown connected to each of lower cross member 48 and upper cross member 44. As best shown in FIG. 12b, clip 80 is generally of truncated triangular shape, having a notch defining arms 82, mouth 84, and a tail slot 88. Tail slot 88 is located on the rear end of clip 80.

Upper cross member 44 is constructed by first welding the rounded plate 62 to the angled cradle 60 (FIG. 5). Notches 96 are then punched from vertical support plate 64 (FIG. 12a). Tail slot 88 of clip 80 is then transversely rotated with notches 96 and welded in position. Alternatively, however, clip 80 may be configured to be positionable at any portion of vertical support 64. The combined angled cradle 60 and rounded plate 62 are then positioned relative to clip 80 and welded in place to vertical support plate 64.

A horizontal top plate 63, shown in FIG. 13, may then optionally be welded to rounded vertical plate 62. Horizontal top plate 63 is 1/16 inch thick and fits between the arms 82 of clips 80. Carpeting may be applied on top of top plate 63 to cushion the receipt of drum 20 (not shown).

The arms 82 of clip 80 forms a mouth 84 which receives the tire 26 of drum 20 (FIG. 1). Clips 80 cooperate with tire 26 to prevent longitudinal movement of drum 20 in support 30. Tire 26 is preferably a steel collar about 4 inches wide that is integral to drum 20. The mouth of clip plate 80 is about 4 inches wide, and tail slot 88 is about ¼ inch wide. When tire 26 is located within clip 80, there will be up to about a 1/8 inch of play.

Figure 10:
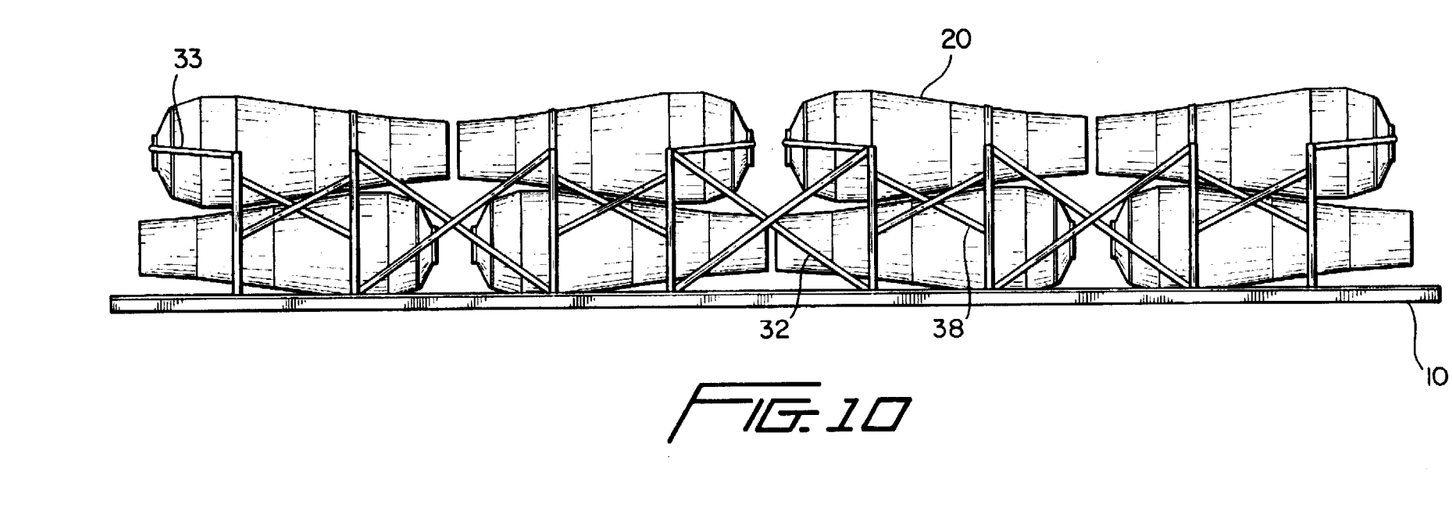
FIG. 10 is an alternative embodiment of the invention showing tension rods or plates at different points connecting support units.
Figure 11:
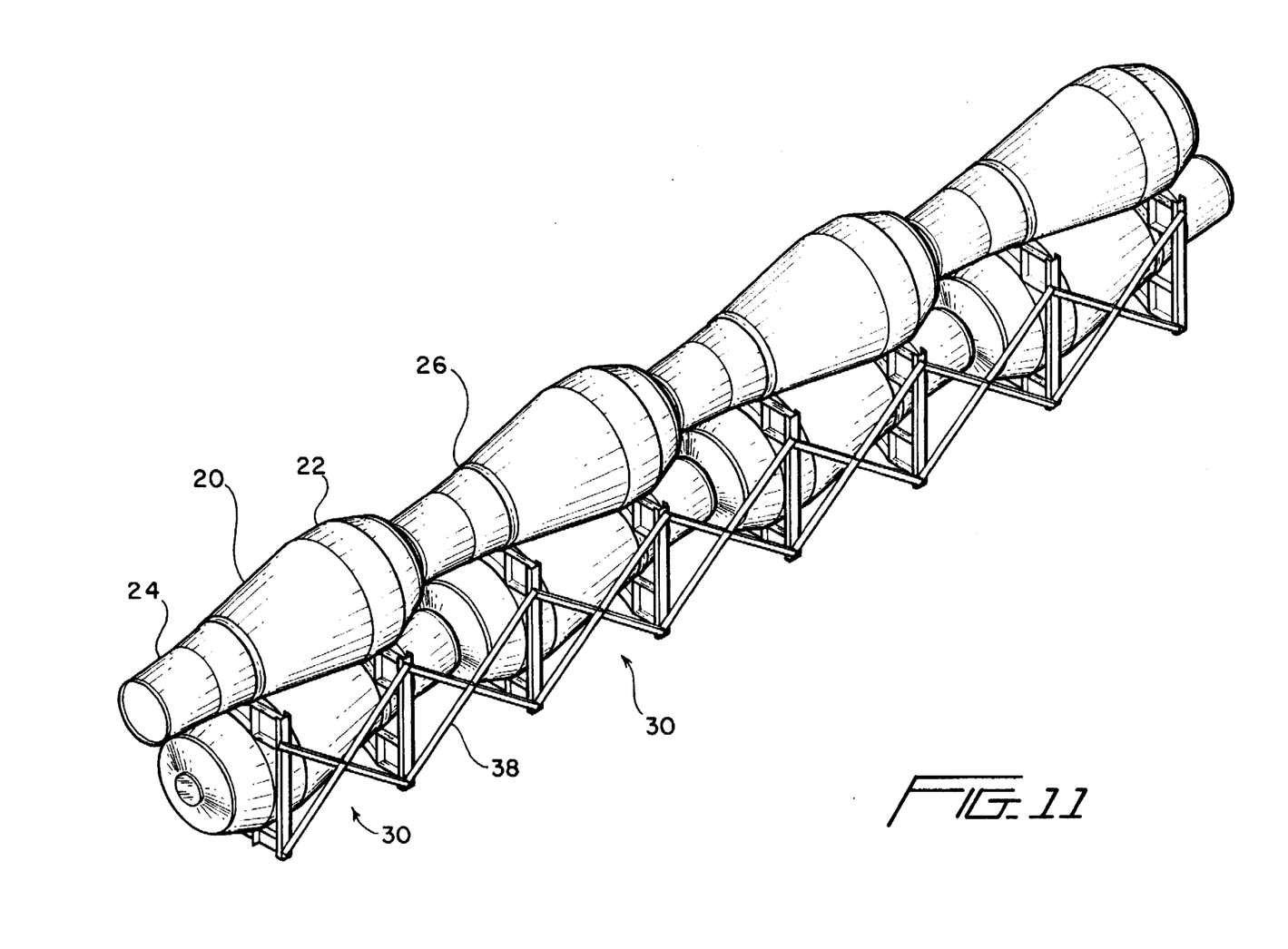
FIG. 11 is a perspective view of yet another alternative embodiment of the present invention in which all the top drums face in one direction and all the bottom drums face in an opposite direction.

Referring again back to FIG. 3, the general assembly of support units 30 will now be described. First, posts 40 are abutted against edge 12 of rail car 10, as shown in FIGS. 1, 10, and 11. Posts 40 are then welded to the deck of rail car 10 and tension wires 38 are welded to vertical posts 40. Due to the taper in drums 20, back frame 36 will be shorter than front frame 34. Consequently, tension wire 38 will not reach the top of vertical post 40 at front frame 34.

Once the tension rods 38 have been assembled, connecting plate 39 is fastened to the intersecting tension rods 38 to prevent separation and reduce vibration. The lower cross members 46, 48 of front and rear frames 34, 36, respectively, are then welded to vertical posts 40. Once the lower cross members 46, 48 have been assembled, the bottom drums 20 are then placed into support unit 30.

Figure 14:
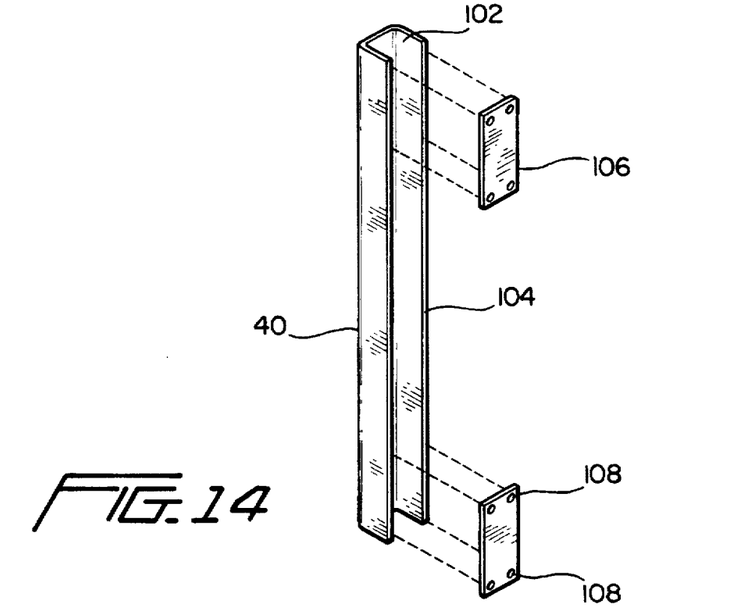
FIGS. 14 and 15 are exploded views showing an upper cross member connecting with a vertical post.
Figure 15:
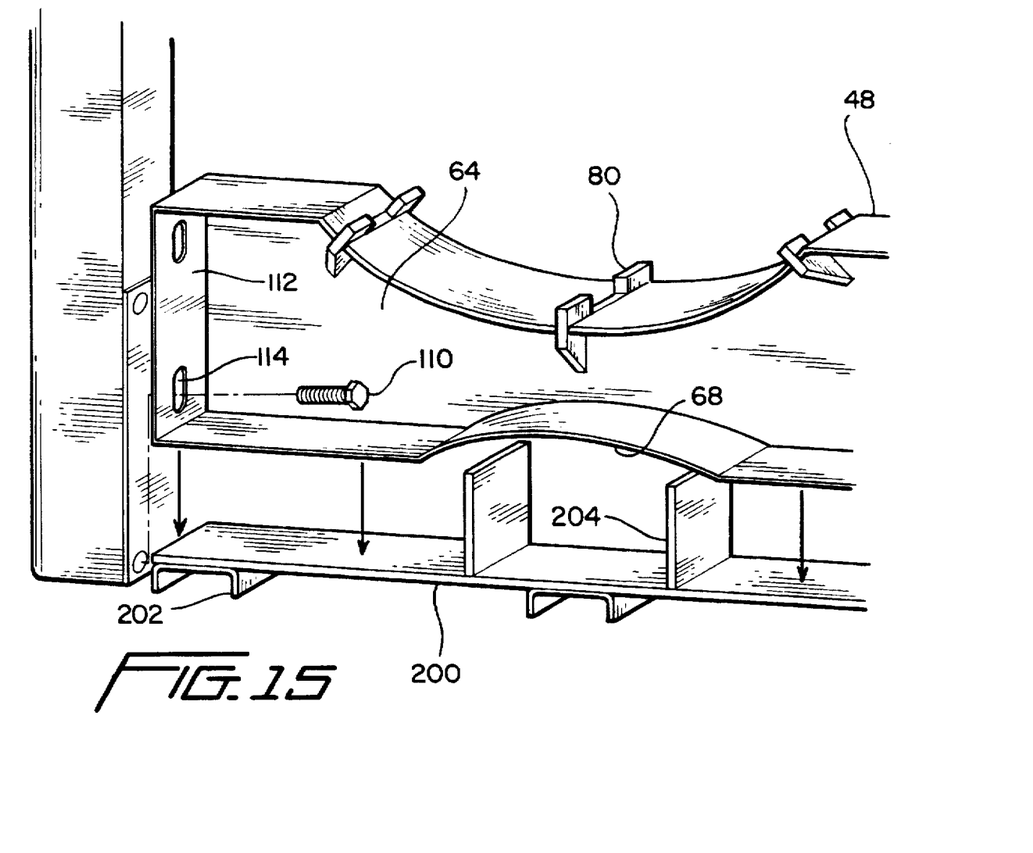

Once the bottom drums 20 are in place, the upper cross members 42, 44 are bolted to vertical posts 40, as will be described with reference to FIGS. 14 and 15. As in FIG. 15, however, lower cross members 46, 48 may also be bolted to posts 40. FIG. 15 shows lower cross member 48 is welded to a base plate 200 having multiple feet 202 and an upright reinforcing member 204. Reinforcement member 204 provides added support to cradle 68. Feet 202 contact the bed of rail car 10.

Posts 40 have a channel 102 defining edges 104. Mounting plates 106 are welded to the edges 104 of post 40. Mounting plate 106 preferably has four through-holes 108, each having a nut (not shown) welded on the back side of mounting plate 106. The nut is aligned with through-holes 108 to receive a bolt 110.

Upper cross member 42 has a side plate 112 having two slots 114 on either side of vertical support plate 64. Slots 114 are aligned with through-holes 108 of mounting plate 106. A bolt 110 is then passed through slot 114 and through-hole 108 to mate with the nut welded on the back side of mounting plate 106. Preferably, bolt 110 is only partially tightened at this point. Bolts 110 will be firmly tightened after the drums 20 have been positioned on support unit 30, and the support unit 30 has settled to the weight of drums 20.

Figure 6:
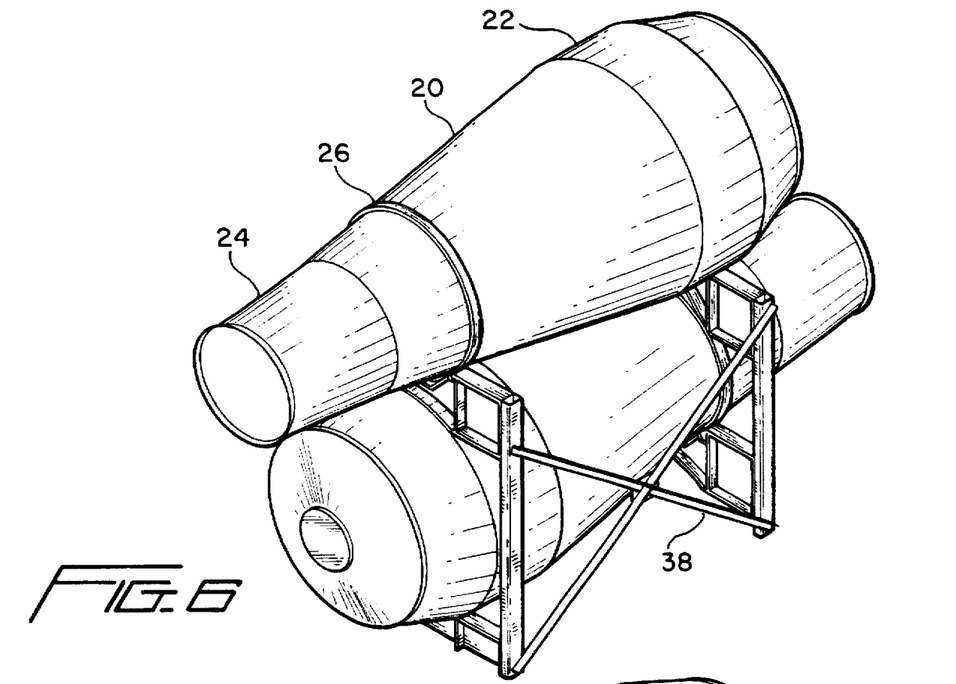
FIG. 6 is a perspective view of an assembled support unit of FIG. 3 supporting two concrete mixing drums.
Figure 7:
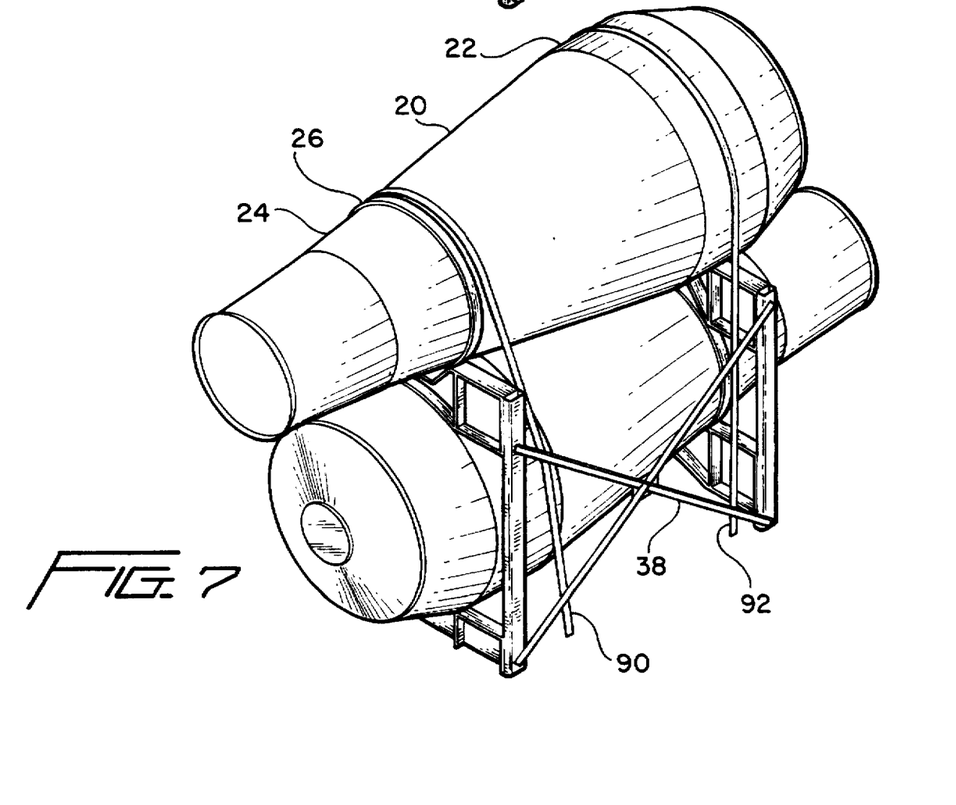
FIG. 7 is a perspective view of an assembled support unit of FIG. 6 with tension bands extending over the top mixing drum.

Once upper cross members 42, 44 are fastened to vertical posts 40, top drums 20 are positioned onto upper cross members 42, 44. An assembled support unit is shown, for instance, in FIG. 6. The top drum 20 locks the bottom drum 20 into position. At the same time, bottom drum 20 provides vertical support to upper cross members 42, 44 to support top drum 20. In FIG. 7, after the top drums 20 are placed on support unit 30, tension straps or bands 90, 92 are placed around the front and rear ends 24, 22 of top drum 20 and secured to eyelets (not shown) located in the floor of the rail car 10. The bands 90, 92 are tightened to further secure top drum 20 to support unit 30. Bands 90, 92 are then fixed by placing a clip about band 90, 92 to form a loop around the eyelet. The clip is then crimped closed, affixing band 90, 92 to train car 10.

Band 90 is placed close to collar 26 so that movement of band 90 in one direction encounters collar 26 and movement of band 90 in an opposite direction encounters the increased diameter of drum 20 towards end 22. This prevents movement of band 90 in either direction.

In the preferred embodiment of the invention, bands 90, 92 are 2 inches in width. In addition, the entire support unit 30, including clips 80, is constructed from steel. Further, ¾ inch bolts are used to secure the upper cross members 42, 44 to posts 40.

FIGS. 8 and 9 show alternative embodiments of the present invention. In FIG. 8, band 92 is shown secured to upper cross member 42. In FIG. 9, band 90 is shown secured to vertical posts 40. Band 90 is attached to a channel 94 located in vertical post 40. Channel 94 is preferably about 6 inches long by 3 inches wide. As further indicated in FIGS. 8 and 9, both the lower 46, 48 and upper support members 42, 44 provide horizontal support to vertical posts 40.

Vertical posts 40 extend above upper support members 42, 44 to provide an added safety precaution against top drum 20 dislodging from support unit 30.

In FIG. 10, an alternative embodiment of the present invention is shown. The vertical posts 40 of neighboring support units 30 are interconnected by tension rods or plates 32. In addition, tension rods 38 are reduced in size and located toward the top of vertical posts 30, where tension rods 38 will have the most leverage to counter forward and rearward forces. Still further, multiple tension rods may be placed along vertical posts 40 to further reduce movement of drums 20. In addition, a tension band 33 is wrapped around the rear end 22 of drum 20 and fastened to vertical posts 40.

FIG. 11 shows yet another embodiment of the drum transport system 100 of the present invention. Here, the bottom drums 20 each face in a first direction, and the top drums 20 face in an opposite second direction. Accordingly, the front end 24 of the bottom drum 20 will be adjacent the rear end 22 of the neighboring bottom drum 20. Likewise, the front end 24 of the top drum 20 will be adjacent the rear end 22 of the neighboring top drum 20. As in FIG. 1, however, each top drum 20 is inversely stacked with a bottom drum 20, such that the front end 24 of the top drum 20 will overlay the rear end 22 of the bottom drum 20.

In addition, support units 30 are interconnected in FIG. 11 by tension rods or plates 32, 38 having equal sizes. The drum transport support system 100 is shown independent of rail car 10. In this manner, support system 100 is shown as a storage system to store concrete drums 20, or similar shaped objects.

The foregoing descriptions and drawings should be considered as illustrative only of the principles of the invention. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

I claim:

1. A support unit for supporting at least one elongated object, each object having a varying circular cross section with a rear end having a larger diameter than a diameter of a front end and an annular collar located about the front end of the object, said support unit comprising:

a first frame having two vertical posts and two support members fastened between the vertical posts and having a rounded surface on each of the two support members facing each other to define an opening for receiving the rear end of the object, and a second frame having two vertical posts and two support members fastened between the second frame vertical posts and having a plurality of clips spaced from each other and connected to each of said second frame support members, each of said plurality of clips including two arms and a mouth formed therebetween so that said plurality of clips on each of said second frame support members define an opening formed by said mouth of each of said plurality of clips for receiving and engaging said annular collar to prevent longitudinal shifting of the object.

2. The support unit of claim 1, wherein one of said support members is connected with a base plate having downwardly extending feet.

3. The support unit of claim 1, further comprising tension rods extending between the vertical posts of said first frame and the vertical posts of said second frame to provide longitudinal support to the support unit.

4. The support unit of claim 1, wherein said second frame further comprises a cradle having a rounded plate fastened between adjacent ones of said plurality of clips.

5. The support unit of claim 1, wherein one of the two support members of said second frame has an outward facing rounded surface for receiving the rear end of another object and one of the two support members of said first frame has a plurality of clips defining an outwardly-facing opening for receiving and engaging the annular collar of the another object to prevent longitudinal shifting of said another object.

6. The support unit of claim 5, further comprising at least one strap extendable about the another object and fastened to the support unit for securing the another object.

7. (Amended) The support unit of claim 1, further comprising at least one mounting plate secured to each vertical post, wherein the support members are fastened to each vertical post by a respective said at least one mounting plate.

8. The support unit of claim 1, wherein each support member has vertical reinforcing members.

9. The support unit of claim 1, wherein respective ones of said arms of each of said plurality of clips lie in a plane extending substantially traverse to said second frame support members.

10. The support unit of claim 9, wherein each said plane extends substantially perpendicular to said second frame support members.

11. A system for storing drums comprising:

an elongated drum having a varying circular cross section with a rear end having a larger diameter than a diameter of a front end and an annular collar located about the front end of the drum, and a support unit including a first frame having two vertical posts and two support members fastened between the vertical posts and having a rounded surface on each of the two support members facing each other to define an opening for receiving the rear end of the drum, and a second frame having two vertical posts and two support members fastened between the vertical posts having a plurality of clips spaced from each other and connected to each of said second frame support members, each of said plurality of clips including two arms and a mouth formed therebetween so that said plurality of clips on each of said second frame support members define an opening formed by said mouth of each of said plurality of clips for receiving and engaging said annular collar to prevent longitudinal shifting of the elongated drum.

12. The system of claim 11, wherein one of the two support members of said second frame has an outward facing rounded surface for receiving the rear end of a second drum and one of the two support members of said first frame has a plurality of clips defining an outwardly-facing opening for receiving and engaging the annular collar of the second drum to prevent longitudinal shifting of the second drum.

13. The system of claim 12, further comprising at least one strap extendable about the second drum and fastenable to a surface for securing the second drum.

14. The system of claim 12, further comprising tension rods extending between the vertical posts of said first frame and the vertical posts of said second frame to provide longitudinal support to the support unit.

15. The system of claim 11, wherein each support member has vertical reinforcing members.

16. The system of claim 11, wherein one of said support members is connected with a base plate having downwardly extending feet.

17. The system of claim 11, wherein said second frame further comprises a cradle having a rounded plate fastened between the plurality of clips.

18. The system of claim 11, further comprising at least one mounting plate secured to each vertical post, wherein the support members are fastened to each vertical post by a respective said at least one mounting plate.

* * * * *